(12) United States Patent
Sakata et al.

(10) Patent No.: US 8,164,882 B2
(45) Date of Patent: *Apr. 24, 2012

(54) CAPACITOR

(75) Inventors: Motohiro Sakata, Osaka (JP);
Toshiyuki Kitagawa, Kyoto (JP); Kouji Moriyama, Kyoto (JP); Kouji Ueoka, Nara (JP); Toshiaki Shimizu, Nara (JP)

(73) Assignee: Panasonic Corporation, Osaka (JP)

( * ) Notice: Subject to any disclaimer, the term of this patent is extended or adjusted under 35 U.S.C. 154(b) by 393 days.

This patent is subject to a terminal disclaimer.

(21) Appl. No.: 12/521,799

(22) PCT Filed: Feb. 4, 2008

(86) PCT No.: PCT/JP2008/000132
§ 371 (c)(1),
(2), (4) Date: Jun. 30, 2009

(87) PCT Pub. No.: WO2008/099578
PCT Pub. Date: Aug. 21, 2008

(65) Prior Publication Data
US 2009/0303662 A1 Dec. 10, 2009

(30) Foreign Application Priority Data

Feb. 14, 2007 (JP) .................. 2007-033182
Dec. 20, 2007 (JP) .................. 2007-328347

(51) Int. Cl.
*H01G 9/10* (2006.01)
(52) U.S. Cl. ........ 361/519; 361/516; 361/517; 361/523; 361/525; 361/528
(58) Field of Classification Search .................. 361/519, 361/516–517, 523–525, 528–529, 535–537, 361/530, 540–541; 29/25.01, 25.03
See application file for complete search history.

(56) References Cited

U.S. PATENT DOCUMENTS
7,916,454 B2 * 3/2011 Shimizu et al. ............... 361/521

FOREIGN PATENT DOCUMENTS
| JP | 3-101054 | 4/1991 |
| JP | 2000-195761 | 7/2000 |
| JP | 2003-100571 | 4/2003 |
| JP | 2004-134632 | 4/2004 |
| JP | 2005-183754 | 7/2005 |

OTHER PUBLICATIONS

International Search Report issued Apr. 22, 2008 in the International (PCT) Application of which the present application is the U.S. National Stage.

* cited by examiner

*Primary Examiner* — Nguyen T Ha
(74) *Attorney, Agent, or Firm* — Wenderoth, Lind & Ponack, LLP.

(57) ABSTRACT

A pressure regulating valve is provided on a terminal plate of a capacitor. This pressure regulating valve includes a gas permeable sheet, a valve body made of silicone rubber, a packing, and a cap. The gas permeable sheet that prevents permeation of electrolyte is provided so as to close a hole created in the terminal plate. The packing is interposed between the valve body and the gas permeable sheet, and is made of an elastic material with moisture permeation resistance higher than that of silicone rubber. The cap is fixed onto the terminal plate and covers the valve body and the packing such that the valve body and the packing are retained in a compressed state with respect to the terminal plate. The valve body and the packing are provided away from the gas permeable sheet.

11 Claims, 12 Drawing Sheets

CAPACITOR

This application is a U.S. national phase application of PCT international application PCT/JP2008/000132, filed Feb. 4, 2008.

TECHNICAL FIELD

The present invention relates to capacitors typically used for electronic devices, regeneration in a range of hybrid vehicles, or power storage.

BACKGROUND ART

Figure 11:
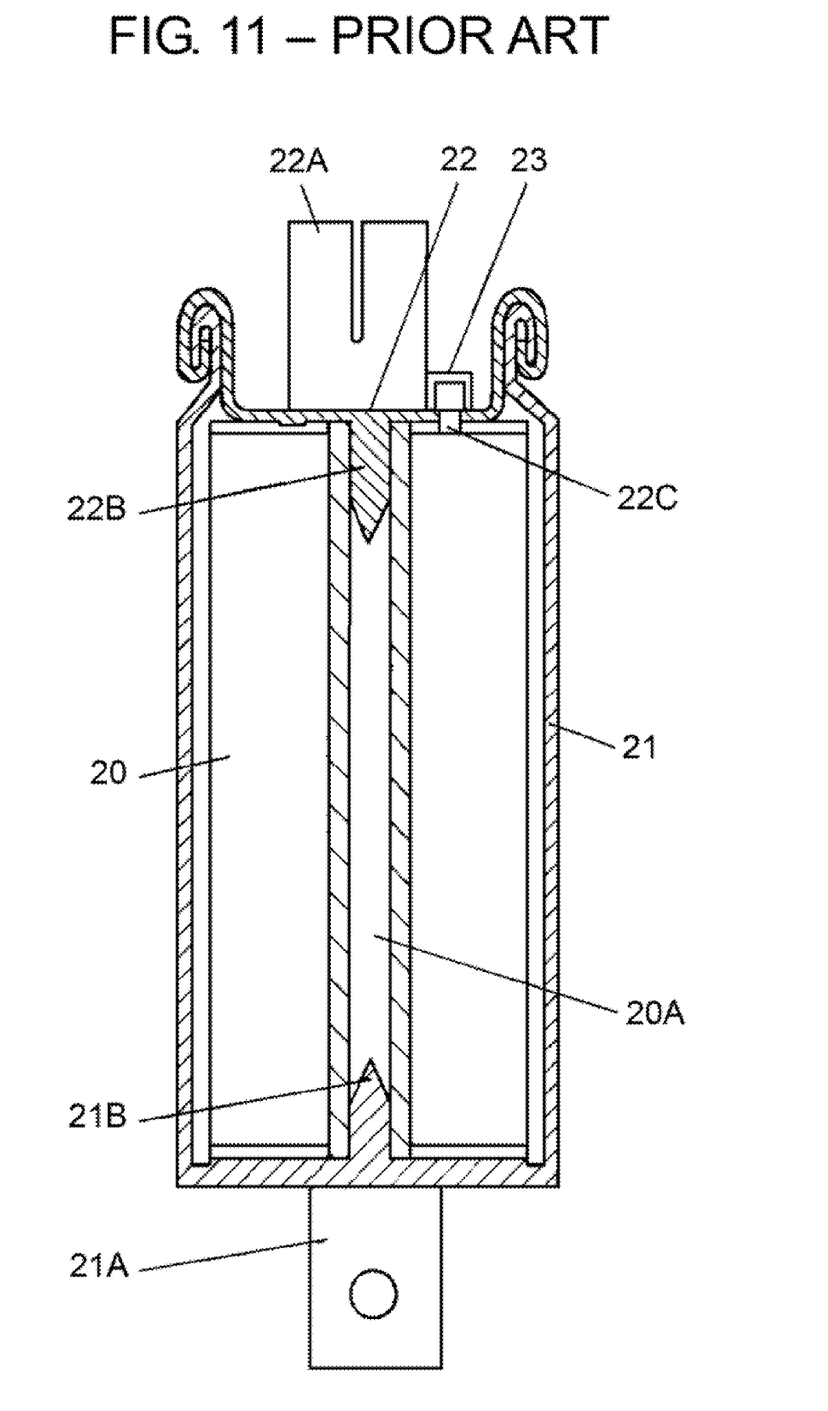
FIG. 11 is a sectional view of a conventional capacitor.
Figure 12:
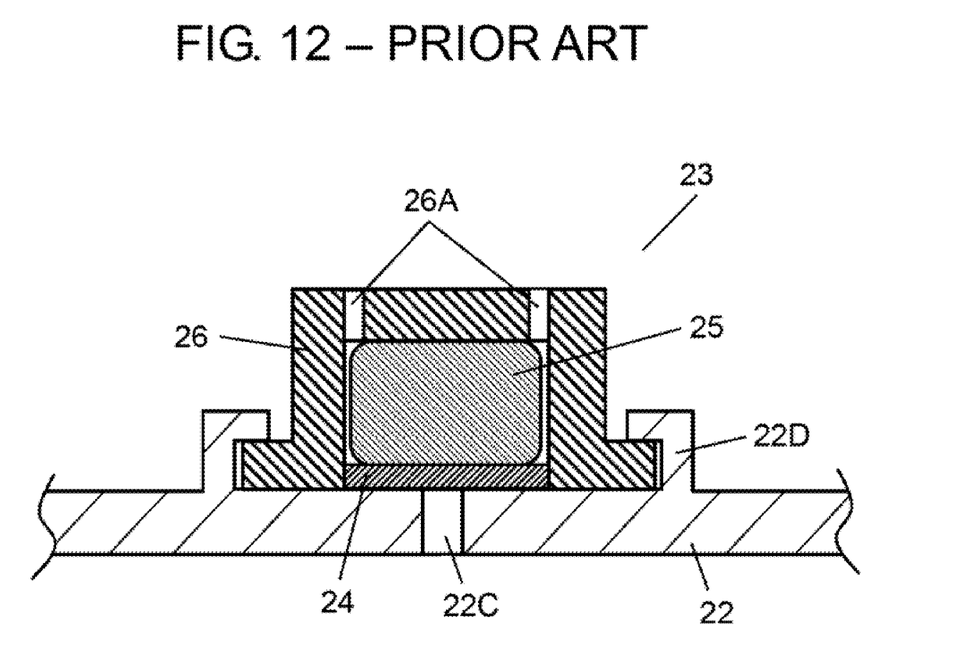
FIG. 12 is a sectional view of a pressure regulating valve of the conventional capacitor.

FIG. 11 is a sectional view of a conventional capacitor, and FIG. 12 is a sectional view illustrating a structure of pressure regulating valve 23 provided in the capacitor. This capacitor includes capacitor element 20 provided with hollow 20A. Capacitor element 20 includes a pair of positive and negative electrodes, in each of which polarizable electrode layers are formed on an aluminum foil current collector, and a separator is interposed therebetween (not illustrated). The positive and negative electrodes are wound in such a manner that they are displaced from each other in the opposite direction (in the vertical direction in FIG. 11). From both ends (upper and lower ends in FIG. 11) of capacitor element 20, positive and negative electrodes are electrically led out, respectively.

Cylindrical case 21 with a bottom made of a metal, such as aluminum, houses capacitor element 20 together with electrolyte (not illustrated). Negative terminal 21A for external connection is provided integrally on the outer bottom face of case 21. Protrusion 21B is provided integrally on the inner bottom face of case 21 so that protrusion 21B is fitted into hollow 20k After protrusion 21B is fitted into hollow 20A, an end face of the negative electrode side in capacitor element 20 that is inserted into case 21 is mechanically and electrically bonded to the inner bottom face of case 21, typically by laser welding.

Positive terminal 22A for external connection is integrally provided on the outer face of aluminum sealing plate 22. Protrusion 22B is fitted into hollow 20A. Hole 22C is provided so as to allow for pouring of the electrolyte. Pressure regulating valve 23 is provided so as to close hole 22C. An end face of the positive electrode side in capacitor element 20, is mechanically and electrically bonded to the inner face of sealing plate 22, typically by laser welding. Furthermore, case 21 is sealed by bending a rim of sealing plate 22 such that the rim wraps around the opening of case 21 (curling process).

As shown in FIG. 12, pressure regulating valve 23 includes gas permeable member 24, blocking body 25, and cap 26. Gas permeable member 24 and blocking body 25 are disposed over hole 22C. Metal cap 26 is fixed so as to cover gas permeable member 24 and blocking body 25, and presses blocking body 25 in a direction that blocking body 25 always blocks hole 26k Cap 26 is provided with hole 26A that leads to outside. Annular convex part 22D is provided on sealing plate 22 around hole 22C. Cap 26 is fixed by deforming convex part 22D, typically by caulking and pressing it against cap 26.

Pressure regulating valve 23 releases gas generated inside the capacitor to the outside when the internal pressure of the capacitor reaches a predetermined pressure or above. Thus, the pressure inside the capacitor is prevented from increasing. Furthermore, after operation, pressure regulating valve 23 returns to the state before operation so as to maintain the air-tightness inside the capacitor. In other words, pressure regulating valve 23 is a self-returning type valve. Therefore, even if the internal pressure is increased due to the generation of gas inside the capacitor, the appearance of the capacitor is not affected, and the characteristic thereof can be maintained.

Furthermore, pressure regulating valve 23 includes gas permeable member 24. Gas permeable member 24 is formed of a material capable of preventing permeation of the electrolyte but allowing a gas generated inside the capacitor to permeate to the outside. By bringing gas permeable member 24 into close contact with sealing plate 22 around hole 22C, it is possible to prevent the function of pressure regulating valve 23 from being impaired due to contact of the electrolyte with blocking body 25. Furthermore, it is possible to prevent the electrolyte from leaking outside of the capacitor via pressure regulating valve 23. Such a capacitor is disclosed in, for example, Japanese Patent Unexamined Publication No. 2004-134632.

As described above, in a conventional capacitor, pressure regulating valve 23 is disposed on hole 22C provided to allow for pouring of the electrolyte. This prevents leakage of the electrolyte. However, pressure regulating valve 23 is provided by directly assembling each member over hole 22C after the capacitor is fabricated and the electrolyte is poured through hole 22C. Therefore, variations in the assembly accuracy of pressure regulating valve 23 lead to variations in the operation of pressure regulating valve 23. In particular, since an amount of compression of blocking body 25 directly affects an operating pressure of pressure regulating valve 23, variations in the operating pressure of pressure regulating valve 23 easily occur. In addition, the operation of pressure regulating valve 23 cannot be checked independently.

With respect to those for use in vehicles, more reliable capacitors are demanded due to the severe environment when used in vehicles. In particular, capacitors including a pressure regulating valve that demonstrates a high operating performance at high temperatures have been demanded.

SUMMARY OF THE INVENTION

The present invention offers a capacitor including a pressure regulating valve with a high heat resistance. The capacitor of the present invention includes a capacitor element, electrolyte, a case, a terminal plate, a gas permeable sheet, a valve body, a packing, and a cap. The capacitor element includes a positive electrode, a negative electrode facing the positive electrode, and a separator interposed between the positive and negative electrodes. The capacitor element is impregnated with the electrolyte. The case having an opening houses the capacitor element and the electrolyte. The terminal plate provided with a first hole seals the opening of the case. The gas permeable sheet is provided such that it closes the first hole so as to prevent permeation of the electrolyte. The valve body made of silicone rubber is disposed facing the gas permeable sheet. The packing is made of an elastic material with resistance to moisture permeation higher than that of silicone rubber, and is disposed between the valve body and the gas permeable sheet. The cap provided with a second hole is fixed to the terminal plate, covers the valve body and the packing, and holds the valve body and the packing in a state that they are compressed with respect to the terminal plate. The valve body and the packing are provided away from the gas permeable sheet. Moisture permeation resistance is retained and also heat resistance can be improved by forming the valve body with silicone rubber and providing the packing between the valve body and the gas permeable sheet.

DETAILED DESCRIPTION OF PREFERRED EMBODIMENTS

First Exemplary Embodiment

Figure 1A:
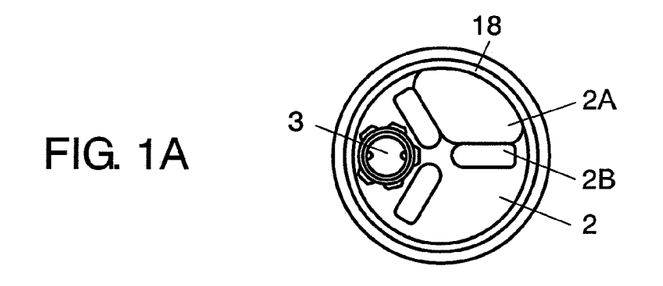
FIG. 1A is a top view of a capacitor in accordance with a first exemplary embodiment of the present invention.
Figure 1B:
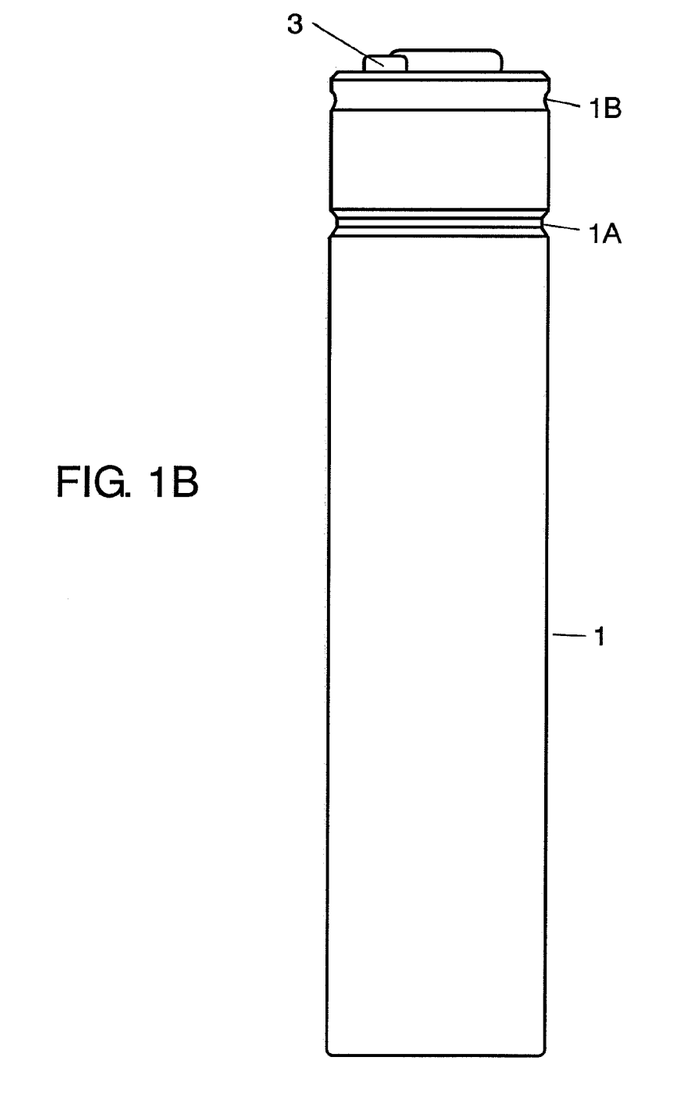
FIG. 1B is a side view of the capacitor shown in FIG. 1A.
Figure 2:
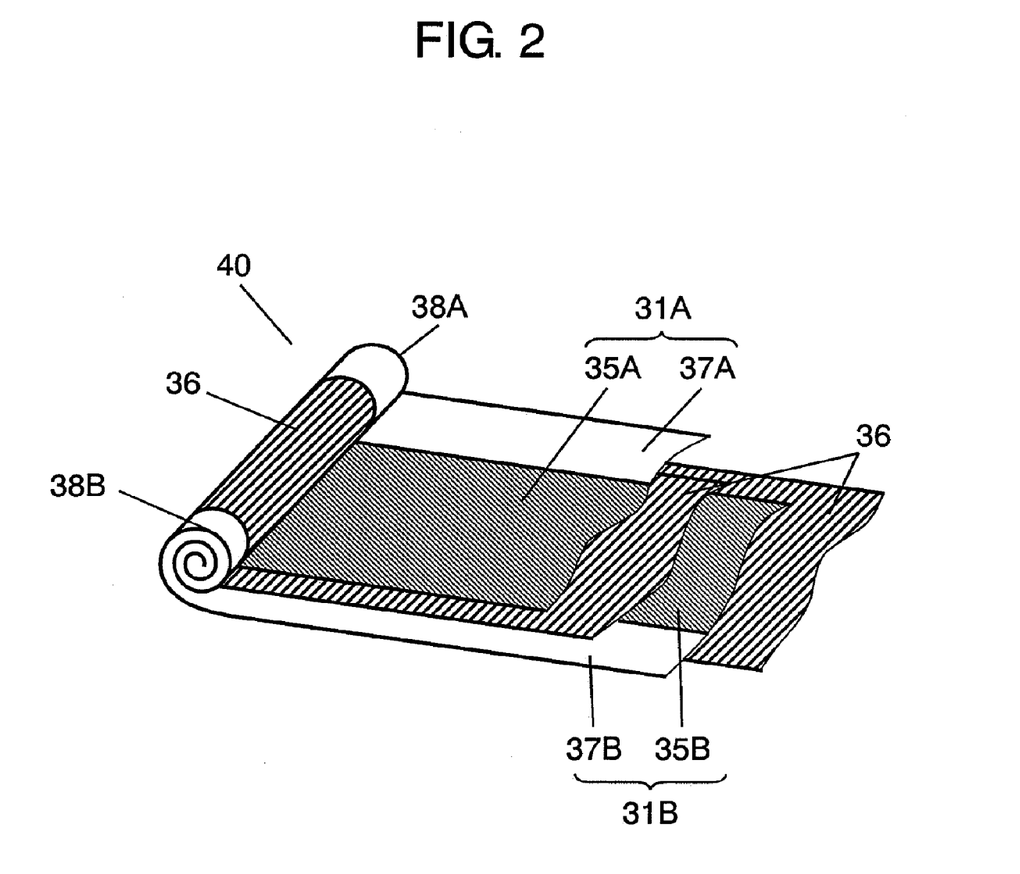
FIG. 2 is an exploded perspective view of a capacitor element housed in the capacitor shown in FIG. 1B.

FIG. 1A is a top view and FIG. 1B is a side view of a capacitor in a first exemplary embodiment of the present invention. FIG. 2 is an exploded perspective view of a capacitor element housed in the capacitor shown in FIG. 1B. As shown in FIG. 2, capacitor element 40 includes positive electrode 31A and negative electrode 31B, facing each other, that are wound with separator 36 therebetween. Positive electrode 31A and negative electrode 31B include collectors 37A and 37B, respectively, in each of which polarizable electrode layers 35A and 35B are formed on both faces. Positive electrode 31A and negative electrode 31B are wound in such a manner that they are displaced from each other in opposite directions. From end faces 38A and 38B on both sides of capacitor element 40, positive electrode 31A and negative electrode 31B are electrically led out, respectively.

As shown in FIGS. 1A and 1B, this capacitor includes metallic case 1, terminal plate 2, and pressure regulating valve 3, in addition to capacitor element 40 shown in FIG. 2.

Metallic cylindrical case 1 with a bottom, made typically of aluminum, has an opening, and stores capacitor element 40 together with electrolyte (not illustrated). Capacitor element 40 is impregnated with the electrolyte. End face 38B of the negative electrode side in capacitor element 40 is mechanically and electrically bonded to the inner bottom surface of case 1, typically by laser welding. In this structure, case 1 also serves as a lead-out electrode on the negative electrode side of capacitor element 40.

End face 38A of the positive electrode side in capacitor element 40 is mechanically and electrically bonded to the inner surface of terminal plate 2, typically by laser welding. Case 1 is sealed by performing a process, such as curling, so that a rim of terminal plate 2 wraps around the opening of case 1 with sealing rubber 18 between the rim of terminal plate 2 and the opening of case 1. In other words, terminal plate 2 seals the opening of case 1. Terminal plate 2 serves as a lead-out electrode on the positive electrode side.

Annular side groove parts 1A and 1B are provided on case 1. Side groove part 1A is provided as a positional reference for capacitor element 40 that is housed inside. Side groove part 1B is provided for sealing case 1 by pressing sealing rubber 18 provided between terminal plate 2 and case 1 against casing 1.

Terminal plate 2 is, for example, made of aluminum. Terminal part 2A and bonding part 2B are provided on terminal plate 2. Terminal part 2A protrudes outwardly from the outer surface of terminal plate 2. Bonding part 2B is formed in a convex shape partially protruding inwardly from the inner surface of terminal plate 2. Bonding part 2B is bonded to end face 38A of capacitor element 40 on the inner face by laser welding.

Figure 3:
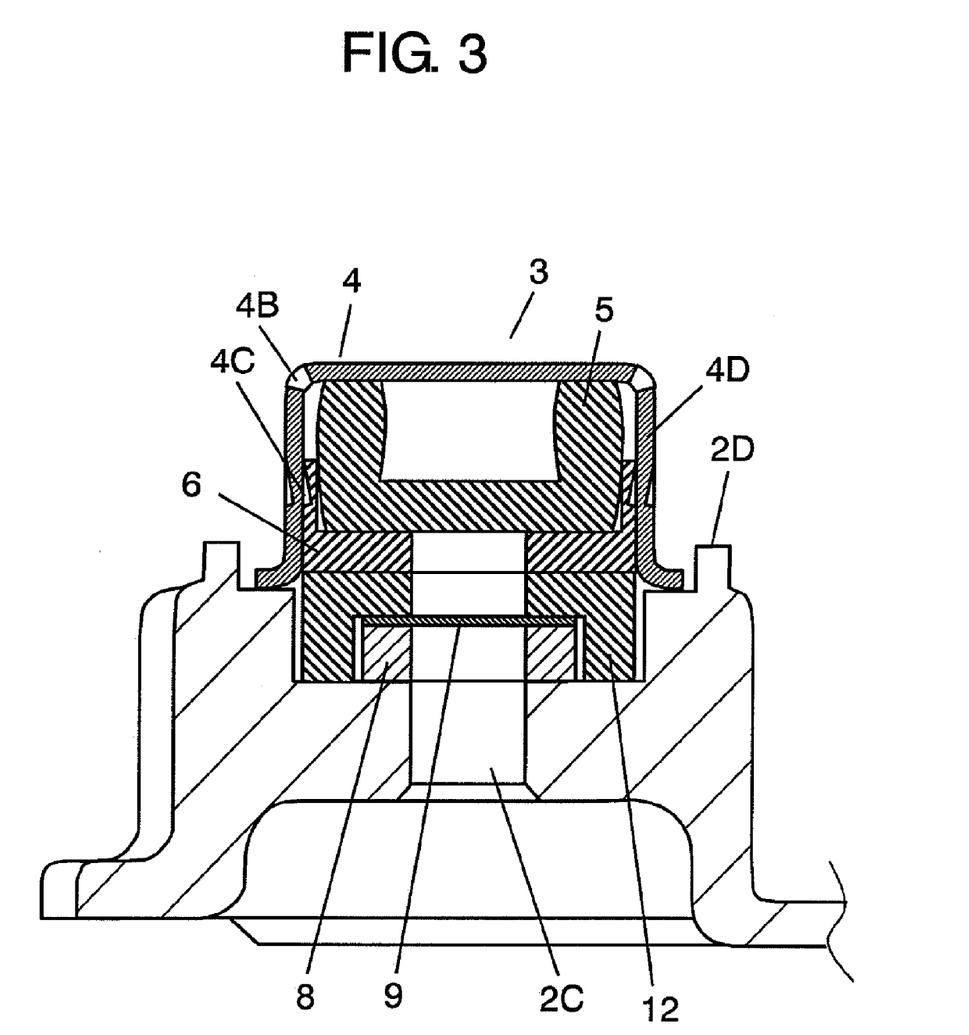
FIG. 3 is a sectional view of a pressure regulating valve used in the capacitor shown in FIG. 1B.
Figure 4:
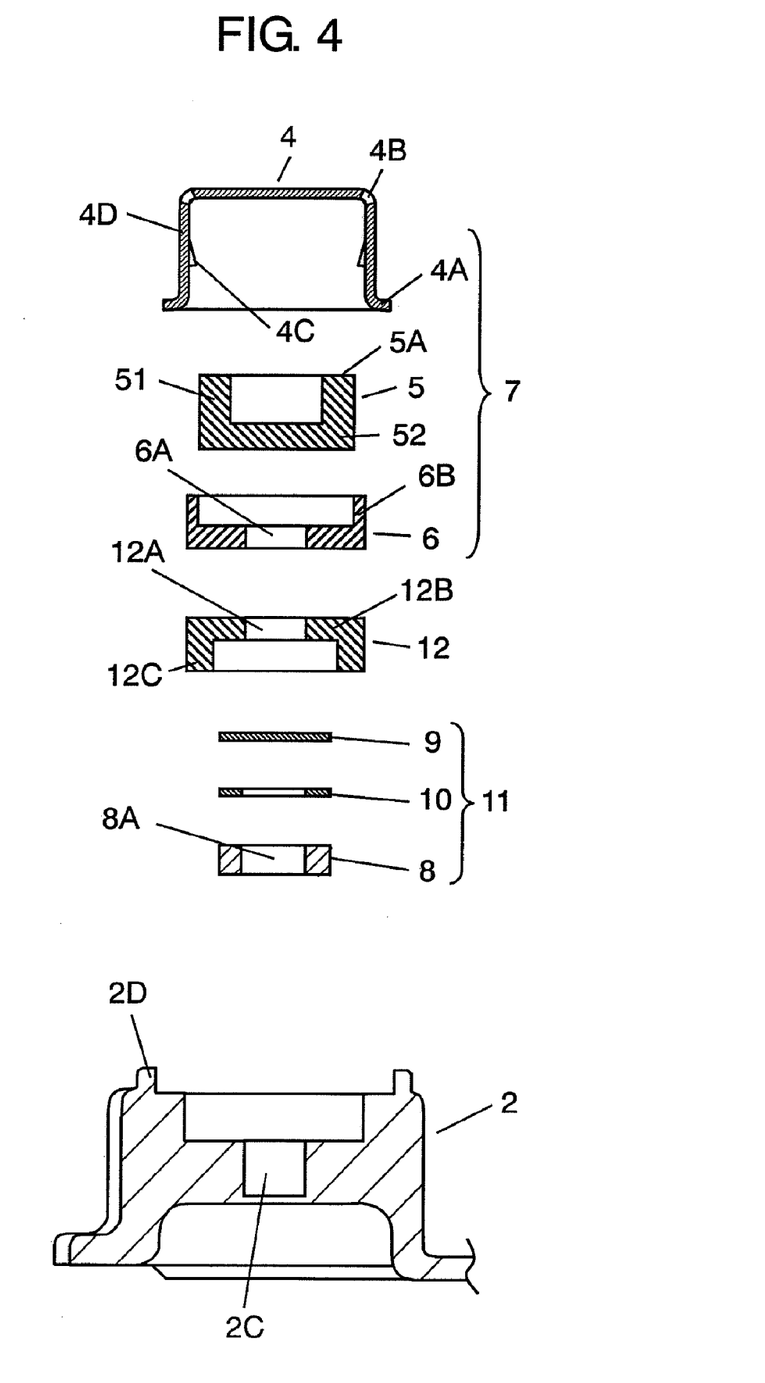
FIG. 4 is an exploded sectional view of the pressure regulating valve shown in FIG. 3.

Next, the structure of pressure regulating valve 3 is described with reference to FIGS. 3 and 4. FIG. 3 is a sectional view of pressure regulating valve 3 coupled to terminal plate 2. FIG. 4 is an exploded sectional view of the pressure regulating valve. Pressure regulating valve 3 is coupled to terminal plate 2 so as to close hole 2C, which is the first hole created in terminal plate 2. Hole 2C is created for pouring of electrolyte.

Pressure regulating valve 3 includes valve unit 7, filter holder 11, and presser rubber 12. Firstly, valve unit 7 is described. Valve unit 7 includes valve body 5, cap 4, and washer 6 as a first washer.

Valve body 5 is made of butyl rubber, for example, and formed in a cylindrical shape with a bottom. Flange 4A is provided at an open end of cylindrical metal cap 4 with a bottom. Hole 4B leading to outside is also created in cap 4 as a second hole. Cap 4 is, for example, made of stainless steel. Washer 6 is made of aluminum, and provided with hole 6A at its center. In addition, annular wall part 6B is integrally provided on a top rim surface of washer 16. However, wall part 6B may not be necessary.

Valve unit 7 is assembled by mounting valve body 5 on washer 6 and press-fitting washer 6 into cap 4. Here, valve body 5 is disposed to close hole 2C such that its central axis substantially matches a central axis of hole 2C created at the center of washer 6, and valve body 5 is retained in a compressed state.

To press-fit washer 6 into cap 4, a jig (not illustrated) is used. This enables accurate control of the press-fitting dimensions. In addition, valve body 5 can be accurately positioned with respect to cap 4 by providing wall part 6B on washer 6 and housing valve body 5 inside wall part 6B.

At least a part of cylindrical part 4D of cap 4 is preferably notched so as to form cut-and-raised part 4C so that this notched part protrudes in cap 4. Provision of cut-and-raised part 4C makes cut-and-raised part 4C provided on cap 4 bite into washer 6 when cap 4 is press-fitted into washer 6. This increases the press-fit bonding strength.

Next, filter holder 11 is described. Round filter holder 11 includes gas permeable sheet 9, adhesive material 10, and washer 8, which is a second washer.

Aluminum washer 8 has hole 8A at its center. Gas permeable sheet 9 transmits gasses generated underneath terminal plate 2 but prevents permeation of the electrolyte. This type of sheet is made of a porous film, such as polytetra-fluoroethylene. Adhesive material 10 is, for example, made of a film of modified polypropylene thereafter referred to as "modified PP"). Gas permeable sheet 9 and washer 8 are bonded by thermal fusion of adhesive material 10. Filter holder 11 is disposed over hole 2C created in terminal plate 2.

Figure 5:
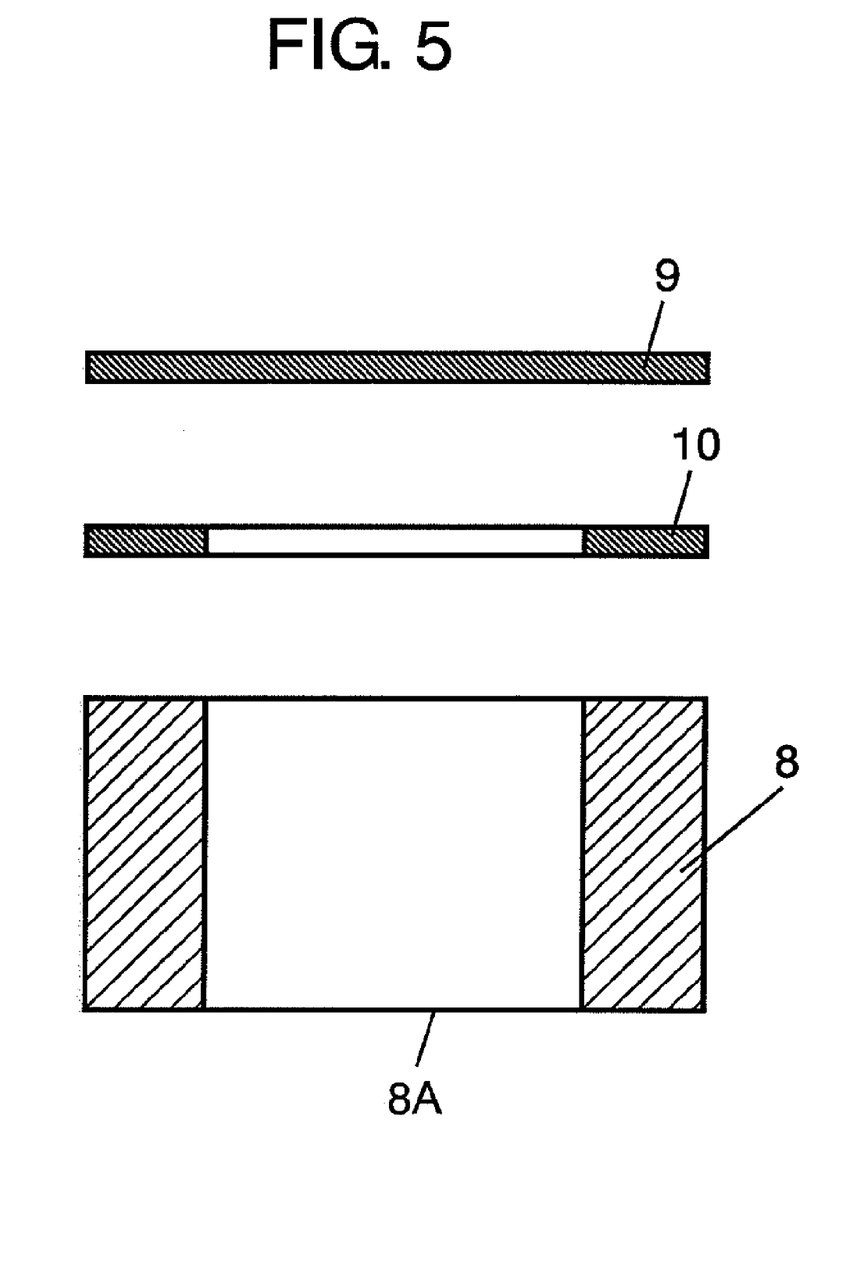
FIG. 5 is an exploded sectional view of a filter holder of the pressure regulating valve shown in FIG. 3.

FIG. 5 is an exploded sectional view of filter holder 11, and illustrates how washer 8 and gas permeable sheet 9 are bonded using adhesive material 10 made of modified PP.

First, washer 8 and gas permeable sheet 9 are overlaid with adhesive material 10 in between. Then, they are heated at 140 to 200° C. for about 10 seconds, and pressed with a pressure of 1 kgf/cm$^2$. This makes melted adhesive material 10 uniformly absorbed into gas permeable sheet 9, and gas permeable sheet 9 and washer 8 are bonded by the anchor effect.

Cylindrical presser rubber 12 includes flat part 12B with hole 12A at its center and wall part 12C around flat part 12B. Presser rubber 12 is, for example, made of butyl rubber.

Procedures for assembling pressure regulating valve 3 on terminal plate 2 by using valve unit 7, filter holder 11, and presser rubber 12 as configured above is described hereinafter.

First, filter holder 11 is disposed on the upper side (outer side) of hole 2C created in terminal plate 2. Then, presser rubber 12 is disposed so as to cover filter holder 11. At this point, presser rubber 12 is disposed such that wall part 12C of presser rubber 12 surrounds filter holder 11. In other words, presser rubber 12 is disposed over hole 2C. Then, valve unit 7 is disposed on presser rubber 12. Protrusion 2D is press-bonded to flange 4A of cap 4 by caulking protrusion 2D provided on terminal plate 2. This mechanically couples cap 4 with terminal plate 2.

At this point, protrusion 2D is caulked such that presser rubber 12 is retained in the compressed state. This makes presser rubber 12 tightly contact the bottom face of washer 6, and presses gas permeable sheet 9 to be bonded to filter holder 11. As described above, valve body 5 is assembled in valve unit 7, and gas permeable sheet 9 is assembled in filter holder 11 separately in pressure regulating valve 3.

In pressure regulating valve 3 as configured above, gas permeable sheet 9 prevents permeation of the electrolyte and transmits only gas when the pressure inside the capacitor increases over a predetermined pressure. Accordingly, the gas with increased pressure pushes up valve body 5, enters inside cap 4 through a boundary face between valve body 5 and washer 6, and is released outside through hole 4B provided in cap 4. After this action, pressure regulating valve 3 returns to the state before operation so that air-tightness inside the capacitor can be retained. In other words, pressure regulating valve 3 is a self-returning type.

Valve unit 7 is assembled so as to retain valve body 5 in the compressed state by press-fitting washer 6 into cap 4 where valve body 5 is disposed. This improves the assembly accuracy of valve unit 7, and reduces variations in a compressed level of valve body 5. In other words, valve body 5 and gas permeable sheet 9 are separated in pressure regulating valve 3. This reduces variations in the operation of pressure regulating valve 3. In addition, the operation of pressure regulating valve 3 can be confirmed by checking valve unit 7 alone.

As show in FIG. 4, valve body 5 is a cylindrical body with a bottom, namely includes cylindrical part 51 and bottom 52. Bottom 52 covers hole 6A in washer 6. Since cap 4 presses valve body 5, cylindrical part 51 is slightly buckled on covering hole 6A. Top face 5A of valve body 5 is substantially parallel to bottom 52. Accordingly, if valve body 5 is pressed and buckled, a vertical stress does not change even if the compressed level slightly changes. Accordingly, the operating pressure of pressure regulating valve 3 further stabilizes.

In the above description, valve body 5 is made of butyl rubber. Still more, valve body 5 is preferably made of ethylene propylene rubber. This also improves oil resistance and chemical resistance. Furthermore, valve body 5 is preferably made of isoprene isobutylene rubber. This further improves water resistance in addition to the above effects.

Second Exemplary Embodiment

Figure 6:
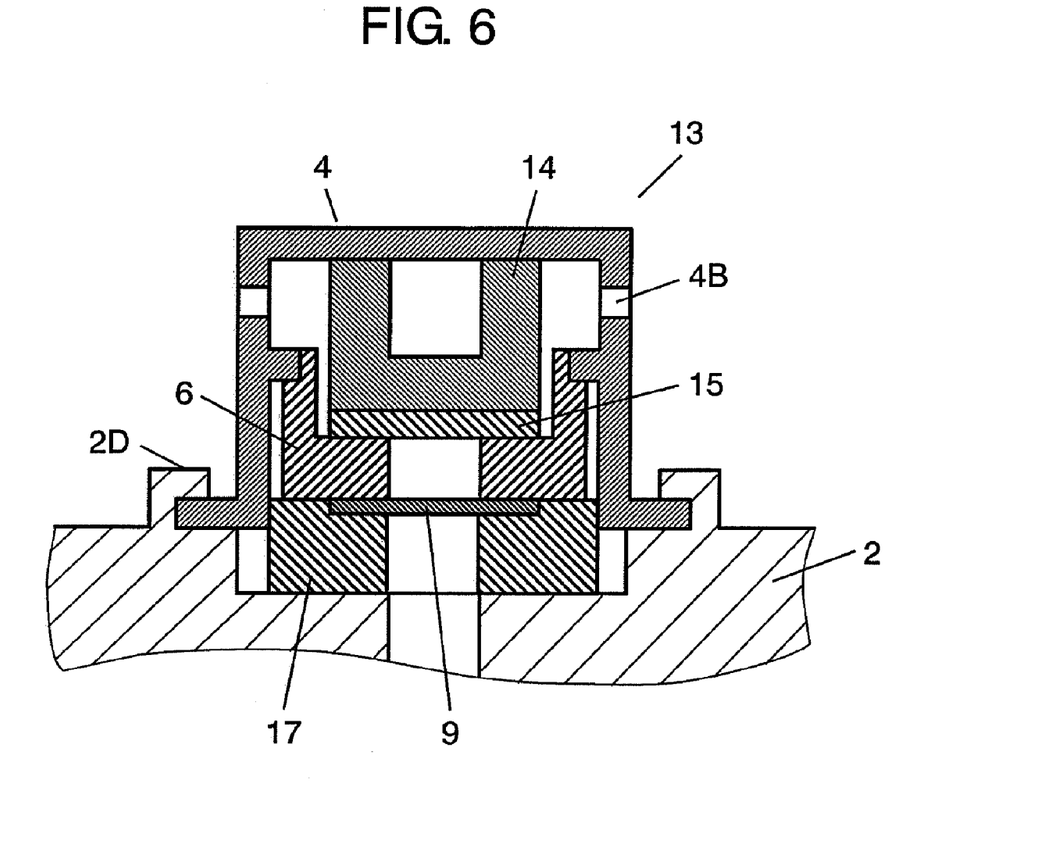
FIG. 6 is a sectional view of a pressure regulating valve used in a capacitor in accordance with a second exemplary embodiment of the present invention.
Figure 7:
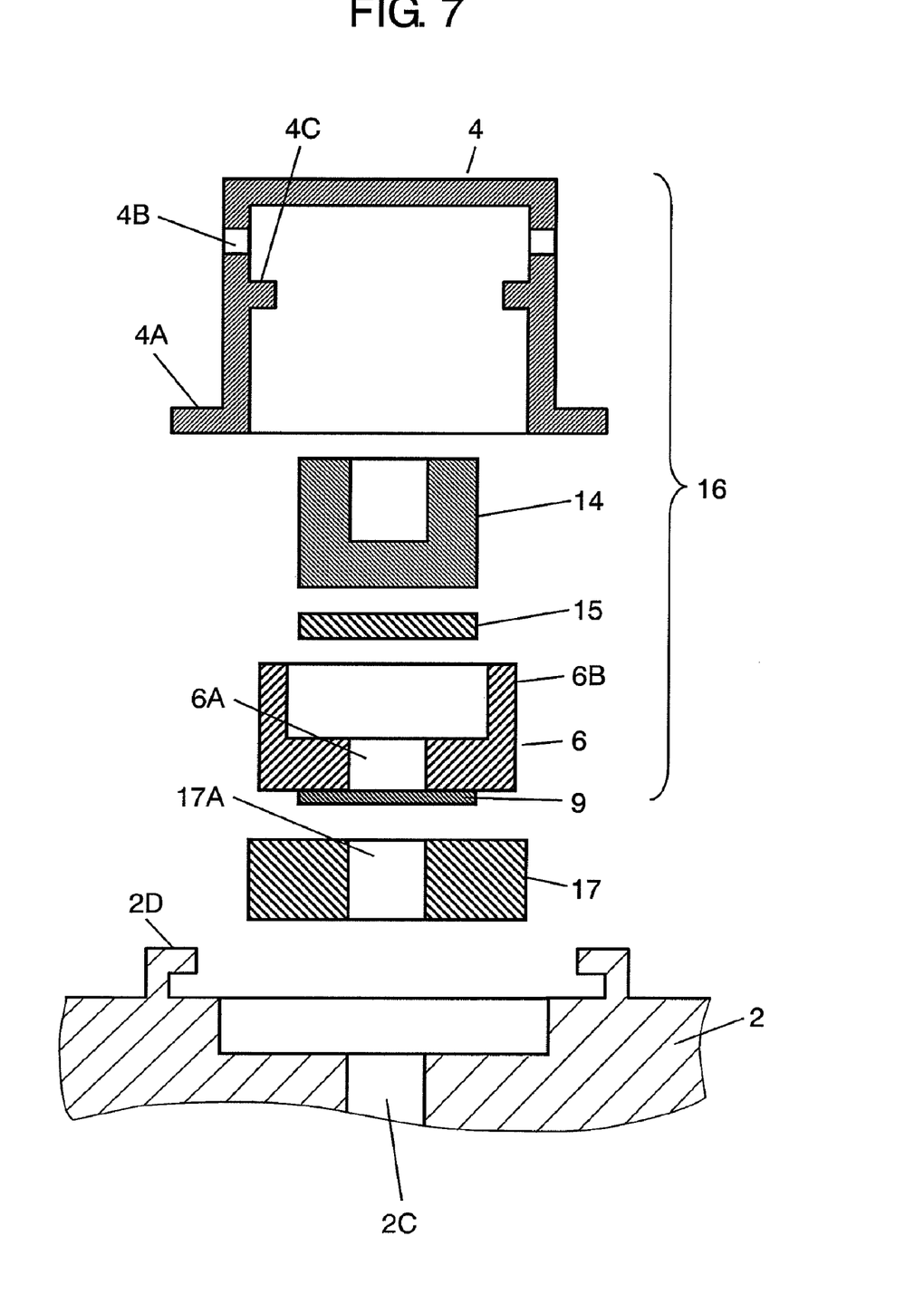
FIG. 7 is an exploded sectional view of the pressure regulating valve shown in FIG. 6.

FIG. 6 is a sectional view of a pressure regulating valve used in a capacitor in a second exemplary embodiment of the present invention. FIG. 7 is an exploded sectional view of the pressure regulating valve. The capacitor according to this exemplary embodiment includes the pressure regulating valve that is partially different from that of the capacitor in the first exemplary embodiment. Other structures are the same as that of the first exemplary embodiment. The same reference marks are given to the same parts so as to omit duplicate description. The points that differ are detailed below.

Pressure regulating valve 13 in this exemplary embodiment includes valve unit 16 and presser rubber 17. Valve unit 16 includes cap 4, valve body 14 made of silicone rubber, packing 15 made of butyl rubber, washer 6, and gas permeable sheet 9. Valve body 14 is cylindrical, and has a bottom. Packing 15 is disk-shaped. Washer 6 is press-fitted into cap 4 in a state that packing 15 and valve body 14 are overlaid on an inner bottom face of washer 6. This causes valve body 14 and packing 15 to be retained in a compressed state. Actions and effects of cut-and-raised part 4C provided on cap 4 and wall part 6B provided on washer 6 are the same as that of the first exemplary embodiment, and thus their description is omitted here. Gas permeable sheet 9 is bonded to the bottom face of washer 6 by thermal fusion of modified PP. In other words, gas permeable sheet 9 is bonded to washer 6 on the side opposite packing 15. Accordingly, valve body 14 and packing 15 are provided away from gas permeable sheet 9. Gas permeable sheet 9 may be fixed, for example, by adhesive.

Hole 17A is created at the center of ring-shaped presser rubber 17. Presser rubber 17 is made of butyl rubber, for example. Valve unit 16 is disposed on presser rubber 17 in a state that presser rubber 17 is placed over hole 2C created in terminal plate 2. Protrusion 2D provided on terminal plate 2 is pressed to and mechanically coupled with flange 4A of cap 4 by caulking protrusion 2D. This makes presser rubber 17 retained in the compressed state.

In pressure regulating valve 13 as configured above, valve body 14 made of silicone rubber is overlaid on packing 15 made of butyl rubber. This structure achieves good heat resistance in addition to the effect obtained by the capacitor in the first exemplary embodiment. Packing 15 is in contact with washer 6. In particular, if packing 15 is made of butyl rubber, and washer 6 is made of aluminum, they are easily attached. If they are closely attached, reliability of valve operation decreases. Accordingly, a liquid that does not have a detrimental effect on the electrolyte or capacitor element 40 and suppresses close adhesion of packing 15 and washer 6 is preferably applied to the surface of packing 15. This treatment may also be applied to valve body 5 in the first exemplary embodiment.

Figure 8:
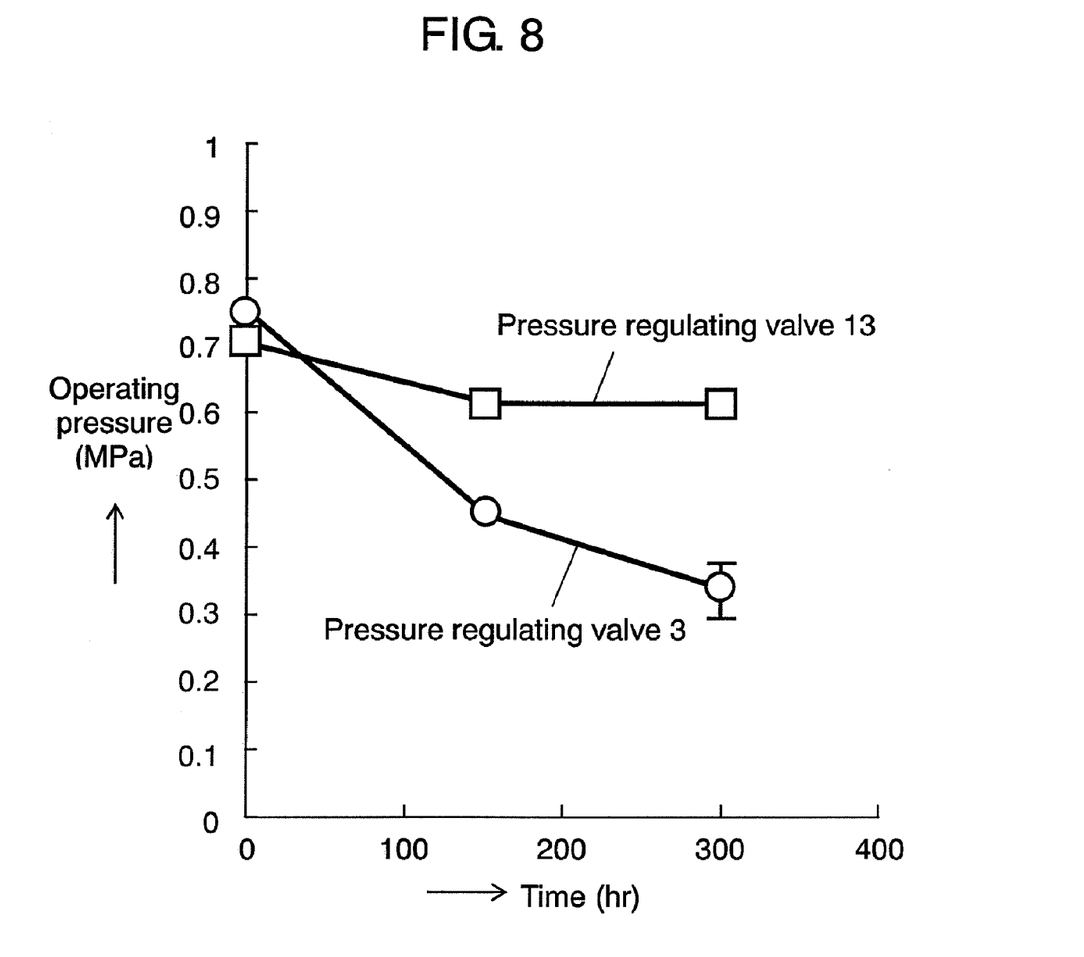
FIG. 8 is a chart illustrating variations in operating pressure in a high temperature test of the pressure regulating valve of the capacitor in accordance with the first and second exemplary embodiments of the present invention.
Figure 9:
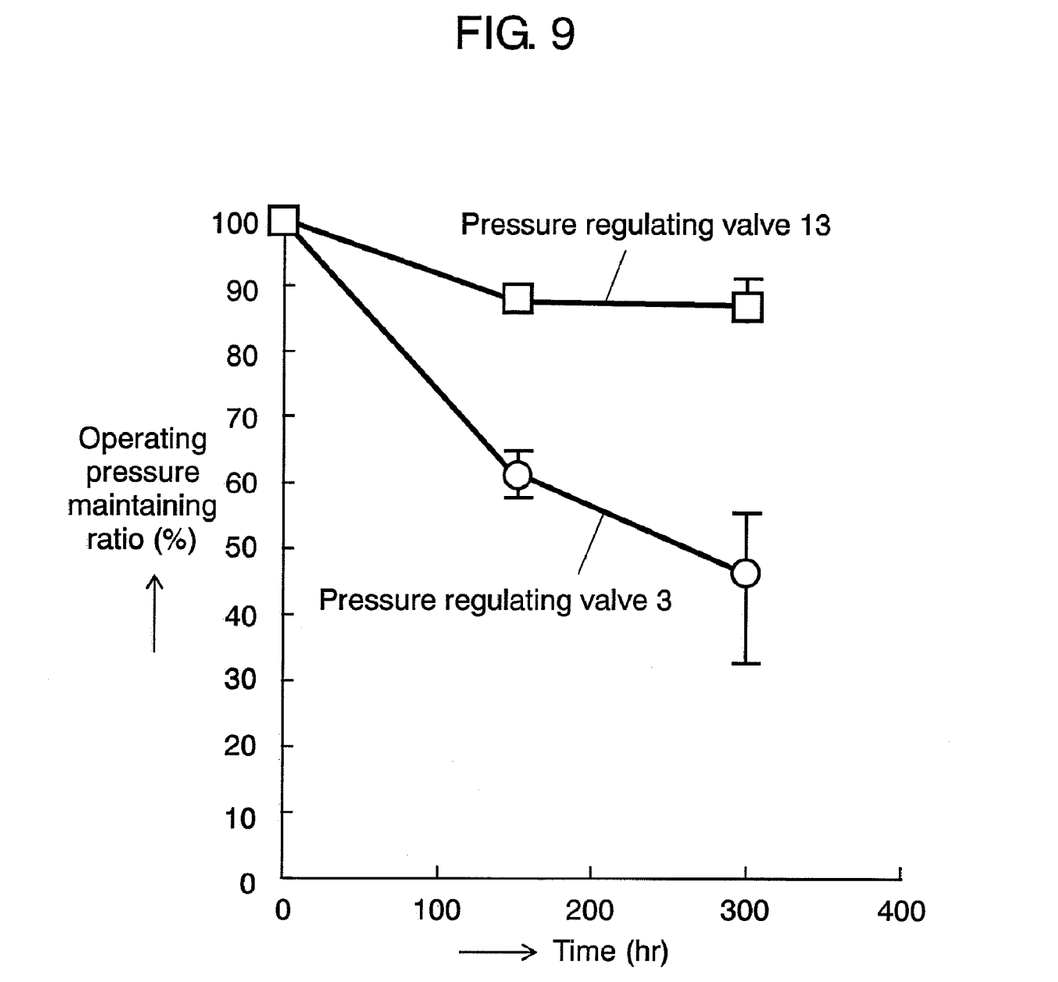
FIG. 9 is a chart illustrating variations in an operating pressure maintaining ratio calculated based on results shown in FIG. 8.

To confirm the effect, a high-temperature test is held at ambient temperature of 85° C. Results of comparison with the first exemplary embodiment are shown in FIGS. 8 and 9. FIG. 8 illustrates changes in operating pressure of pressure regulating valves 3 and 13 by time. FIG. 9 illustrates changes in operating pressure maintaining ratio by time calculated from the test results.

It is apparent from FIGS. 8 and 9 that pressure regulating valve 13 in the second exemplary embodiment retains an operating pressure of 0.62 MPa and high operating pressure rate of 87.4%, even after 300 hours. In comparison, pressure regulating valve 3 in the first exemplary embodiment shows the operating pressure of 0.35 MPa and operating pressure maintaining ratio of 46.7% after 300 hours. These values are also satisfactory for assuring general requirements. However, pressure regulating valve 13 demonstrates higher stability in the operation at high temperatures, and thus better heat resistance.

This high heat resistance is achieved by the use of silicone rubber for valve body 14. Silicone rubber demonstrates good performance at both high temperatures and low temperatures. However, its moisture permeation resistance is poor. To ensure moisture permeation resistance, packing 15 made of butyl rubber, which demonstrates higher moisture permeation resistance than silicone rubber, is disposed on the bottom face (inside the capacitor) of valve body 14. In other words, the bottom of valve body 14 is disposed facing gas permeable sheet 9, and packing 15 is interposed between valve body 14 and gas permeable sheet 9. This structure takes advantage of heat resistance of silicone rubber while retaining high moisture permeation resistance.

Other than the combination of valve body 14 made of silicone rubber and packing 15 made of butyl rubber, fluororubber with a good low-temperature characteristic may be used for the valve body. This also satisfies all requirements for high temperatures, low temperatures, and gas permeability. However, fluororubber is extremely expensive. Accordingly, from the viewpoint of practical use, the combination of valve body 14 made of silicone rubber and packing 15 made of butyl rubber is preferable.

Figure 10:
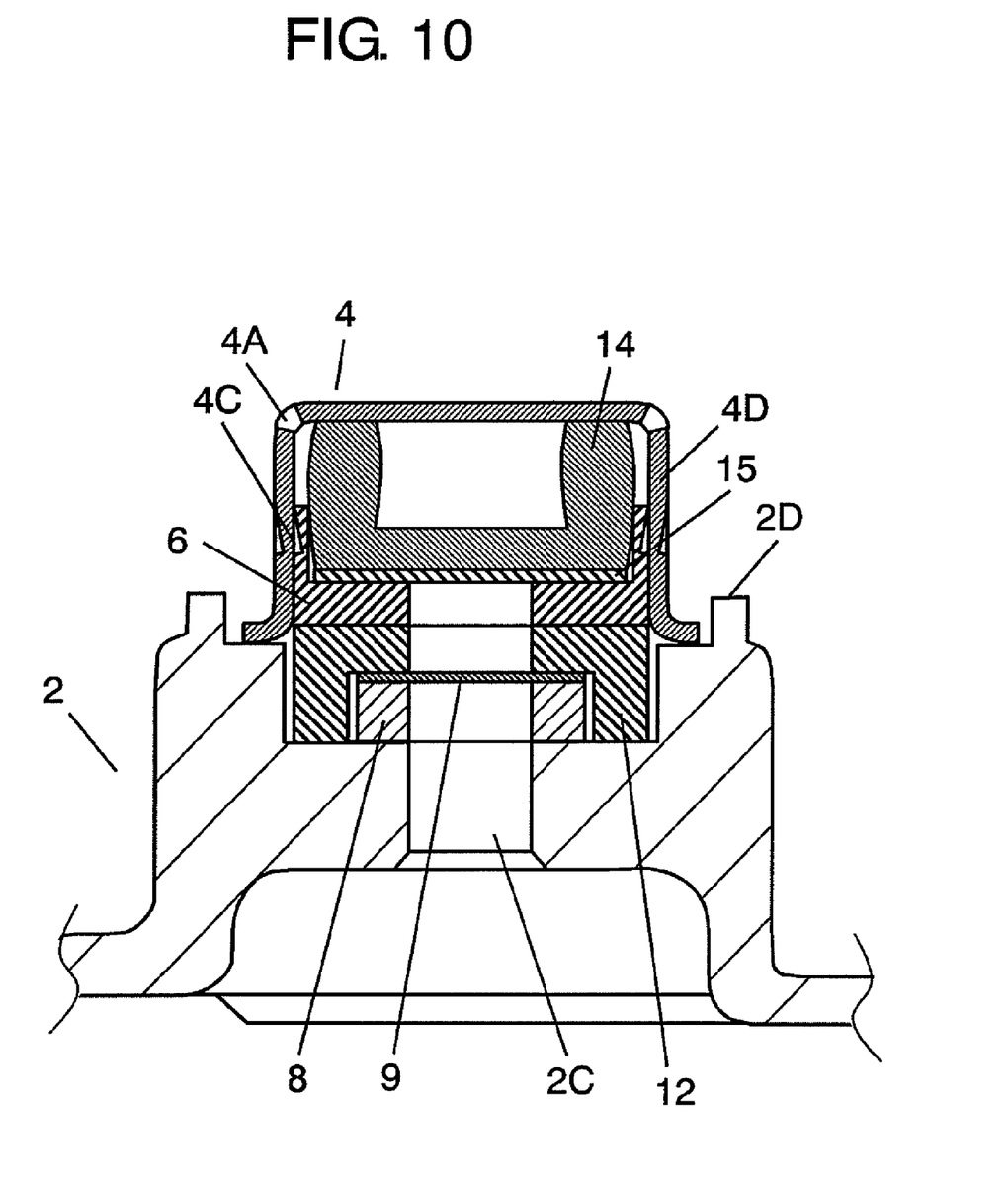
FIG. 10 is a sectional view of another pressure regulating valve used in the capacitor in accordance with the second exemplary embodiment of the present invention.

In the above description, gas permeable sheet 9 is bonded to the outer bottom surface of washer 6. However, gas permeable sheet 9 may be bonded on a top surface of hole 2C created in terminal plate 2 after the electrolyte is filled. Still more, as shown in FIG. 10, valve body 14 and packing 15 are applicable to the structure in the first exemplary embodiment. In other words, valve body 14 and packing 15 may be used instead of valve body 5.

Other than butyl rubber, packing 15 may be made of ethylene propylene rubber or isoprene isobuthylene rubber. In other words, any elastic material that can close hole 6A in washer 6 and has moisture permeation resistance is applicable.

In the first and second exemplary embodiments, case 1 and terminal plate 2 also act as lead-out electrodes of the electrodes of capacitor element, respectively. However, a lead wire may be used to provide a lead-out electrode from capacitor element 40. In addition, case 1 and terminal plate 2 are directly connected to the electrodes of capacitor element 40 by laser welding, respectively, in the exemplary embodiments. However, collector plates may be welded on the top and bottom of capacitor element 40, respectively, and each of these collector plates and case 1 or terminal plate 2 may be connected, respectively.

In the second exemplary embodiment, valve unit 16 is formed and coupled to terminal plate 2. However, gas permeable sheet 9 may be fixed to terminal plate 2 inside case 1. Still more, if there is no need to confirm the operation of valve unit 16 alone as the pressure regulating valve 13, washer 6 and presser rubber 17; or washer 6, presser rubber 12, and washer 8 may not be used. In other words, packing 15 may come into a direct contact with hole 2C. Also in this case, the capacitor demonstrates good heat resistance by the use of valve body 14 made of silicone rubber and packing 15.

Furthermore, in the second exemplary embodiment, valve body 14 has a cylindrical shape with a bottom. However, other shapes also demonstrate good heat resistance by use of valve body 14 of silicone rubber and packing 15.

The capacitor of the present invention reduces variations in operation of the pressure regulating valve, and demonstrates stable performance. Furthermore, this capacitor has good heat resistance. Accordingly, the present invention is effectively applicable to capacitors for vehicles that demand particularly high reliability.

The invention claimed is:

1. A capacitor comprising:
    a capacitor element including a positive electrode, a negative electrode facing the positive electrode, and a separator interposed between the positive electrode and the negative electrode;
    electrolyte impregnated in the capacitor element;
    a case with an opening, the case housing the capacitor element and the electrolyte;
    a terminal plate provided with a first hole, the terminal plate sealing the opening of the case;
    a gas permeable sheet closing the first hole so as to prevent permeation of the electrolyte;
    a valve body disposed facing the gas permeable sheet;
    a cap with an opening, the cap being fixed to the terminal plate around the opening of the cap and covering the valve body so as to retain the valve body in a compressed state with respect to the terminal plate, the cap being provided with a second hole;
    a ring-shaped first washer press-fitted into the opening of the cap, the first washer retaining the valve body in the compressed state with the cap; and
    a ring-shaped presser rubber disposed on the first hole;
    wherein the cap, the valve body, and the first washer configure a valve unit, and the presser rubber is retained in a compressed state by attaching the valve unit to the terminal plate.

2. The capacitor according to claim 1, wherein the valve body has a cylindrical part and a bottom part, and the bottom part faces the gas permeable sheet.

3. The capacitor according to claim 1, further comprising a ring-shaped second washer to which the gas permeable sheet is bonded,
    wherein the gas permeable sheet and the second washer configure a filter holder disposed so as to close the first hole from an outside of the case, and
    the presser rubber covers the filter holder from above the gas permeable sheet, and the presser rubber is retained in the compressed state between the filter holder and the first washer.

4. The capacitor according to claim 3, wherein the second washer and the gas permeable sheet are bonded by thermally-fused modified polypyropylene.

5. The capacitor according to claim 1, wherein the gas permeable sheet is bonded to the first washer on a side opposite the valve body by thermally-fused modified polypropylene.

6. The capacitor according to claim 1, wherein the terminal plate and the gas permeable sheet are bonded by thermally-fused modified polypropylene.

7. The capacitor according to claim 1, wherein an annular wall part is provided on a top rim surface of the first washer, and the valve body is housed inside the wall part.

8. The capacitor according to claim 1, wherein the cap has a cylindrical part, and a cut-and-raised part is provided on at least a part of the cylindrical part, the cut-and-raised part protruding inward of the cap.

9. The capacitor according to claim 1, wherein the gas permeable sheet is made of a porous film of polytetrafluoroethylene.

10. The capacitor according to claim 1, further comprising a packing between the valve body and the gas permeable sheet, the packing being made of an elastic material that has a water permeability resistance higher than that of silicone rubber;
    wherein the valve body is made of silicone rubber, and
    the first washer retains the valve body and the packing in a compressed state with the cap.

11. The capacitor according to claim 10, wherein the packing is made of one of butyl rubber, ethylene propylene rubber, and isopyrene isobuthylene rubber.

* * * * *